(12) United States Patent
Ornella et al.

(10) Patent No.: US 10,266,017 B2
(45) Date of Patent: Apr. 23, 2019

(54) INTEGRATION OF SENSOR NETWORK AND METHOD OF OPERATION INTO A CTIS FRAMEWORK

(71) Applicant: Dana Italia SPA, Arco (IT)

(72) Inventors: Giulio Ornella, Arco (IT); Alessandro Massei, Riva del Garda (IT); Carlos Maximiliano Giorgio Bort, Trento (IT); Fabrizio Zendri, Rovereto (IT); Donald J. Remboski, Ann Arbor, MI (US); Doug D. Turner, Holland, OH (US)

(73) Assignee: Dana Italia S.R.L., Arco (IT)

(*) Notice: Subject to any disclaimer, the term of this patent is extended or adjusted under 35 U.S.C. 154(b) by 181 days.

(21) Appl. No.: 15/047,887

(22) Filed: Feb. 19, 2016

(65) Prior Publication Data

US 2016/0243903 A1   Aug. 25, 2016

Related U.S. Application Data

(60) Provisional application No. 62/118,014, filed on Feb. 19, 2015.

(51) Int. Cl.
*B60C 19/00* (2006.01)
*B60C 23/00* (2006.01)
(Continued)

(52) U.S. Cl.
CPC ............ *B60C 23/003* (2013.01); *B60C 19/00* (2013.01); *G01D 5/145* (2013.01); *B60C 2019/004* (2013.01); *Y10S 439/927* (2013.01)

(58) Field of Classification Search
CPC combination set(s) only.
See application file for complete search history.

(56) References Cited

U.S. PATENT DOCUMENTS 4,497,493 A * 2/1985 Sall .................. F16J 15/3404
                                              277/306
5,253,688 A   10/1993 Tigges
(Continued)

FOREIGN PATENT DOCUMENTS

DE   10064231 A1   9/2001
EP    0588595 A1   3/1994
(Continued)

OTHER PUBLICATIONS

HB Mitchell, Multi-sensor data fusion: an introduction, 2007 (Year: 2007).*

(Continued)

*Primary Examiner* — Alan D Hutchinson
(74) *Attorney, Agent, or Firm* — Marshall & Melhorn, LLC

(57) ABSTRACT

A rotary joint for use with a central tire inflation system and a network of sensorized components for a driveline is provided. The rotary joint comprises a sealing gasket wear detection system and a rotary encoder disposed within a joint cavity. The network of sensorized components comprises a sensorized wheel hub, a transmission speed sensor, and a controller in communication with the sensorized wheel hub and the transmission speed sensor through a communication bus. A method of utilizing a network of sensorized components to analyze a driveline and a method for monitoring a wear of a sealing gasket of a rotary joint is also provided.

20 Claims, 11 Drawing Sheets

(51) Int. Cl.
  *B60C 23/04* (2006.01)
  *B60R 16/027* (2006.01)
  *G01D 5/14* (2006.01)

(56) References Cited

U.S. PATENT DOCUMENTS

| | | | |
|---|---|---|---|
| 5,431,413 A * | 7/1995 | Hajzler | F16C 33/7859 |
| | | | 277/317 |
| 5,540,448 A * | 7/1996 | Heinzen | F16J 15/16 |
| | | | 116/208 |
| 5,754,967 A | 5/1998 | Inoue et al. | |
| 5,868,881 A | 2/1999 | Bradley | |
| 6,003,872 A * | 12/1999 | Nord | F16J 15/3296 |
| | | | 277/317 |
| 6,045,133 A | 4/2000 | Lannert et al. | |
| 6,145,558 A | 11/2000 | Schmitz | |
| 6,182,727 B1 | 2/2001 | Beesley | |
| 6,325,123 B1 | 12/2001 | Gao et al. | |
| 6,363,985 B1 | 4/2002 | Beesley | |
| 6,497,262 B1 | 12/2002 | Skoff et al. | |
| 6,538,426 B1 * | 3/2003 | Enrietto | G01D 5/145 |
| | | | 324/165 |
| 6,595,523 B1 | 7/2003 | Heinzen | |
| 6,615,639 B1 | 9/2003 | Heinzen | |
| 7,302,979 B2 | 12/2007 | Davison et al. | |
| 7,306,020 B2 | 12/2007 | Beverly et al. | |
| 7,559,259 B2 | 7/2009 | Fruhwirth et al. | |
| 8,234,050 B2 | 7/2012 | Burns et al. | |
| 8,264,347 B2 | 9/2012 | Castleman | |
| 8,371,350 B2 | 2/2013 | Collet et al. | |
| 8,397,774 B2 | 3/2013 | Gonska et al. | |
| 8,457,847 B2 | 6/2013 | Li et al. | |
| 8,494,729 B2 | 7/2013 | Li et al. | |
| 8,540,249 B2 | 9/2013 | Prellwitz | |
| 8,783,314 B2 | 7/2014 | Tigges | |
| 2005/0114007 A1 * | 5/2005 | Pillar | A62C 27/00 |
| | | | 701/82 |
| 2010/0187954 A1 * | 7/2010 | Kendall | B60K 7/0007 |
| | | | 310/67 R |
| 2012/0267858 A1 | 10/2012 | Rust | |

FOREIGN PATENT DOCUMENTS

| | | |
|---|---|---|
| FR | 2874671 A1 | 3/2006 |
| WO | 2013156430 A1 | 10/2013 |
| WO | 2014063873 A2 | 5/2014 |

OTHER PUBLICATIONS

International Search Report and Written Opinion for application No. PCT/EP2015/065074 dated Sep. 4, 2015, issued by the European Patent Office.

* cited by examiner

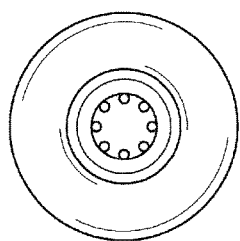
FIG. 1A
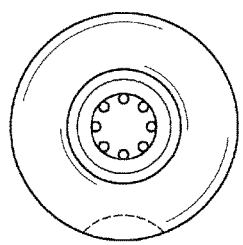
FIG. 1C
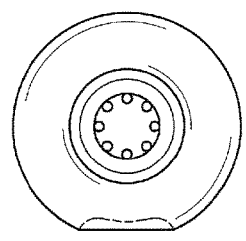
FIG. 1E
FIG. 1B
FIG. 1D
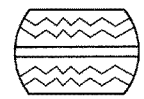
FIG. 1F
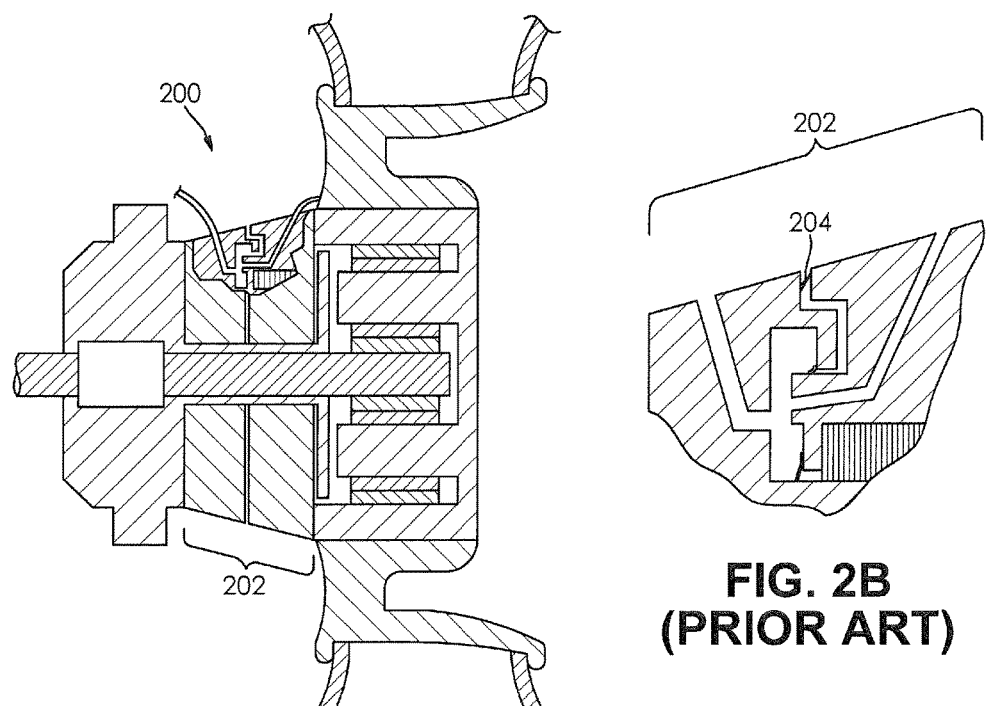
FIG. 2A
(PRIOR ART)
FIG. 2B
(PRIOR ART)

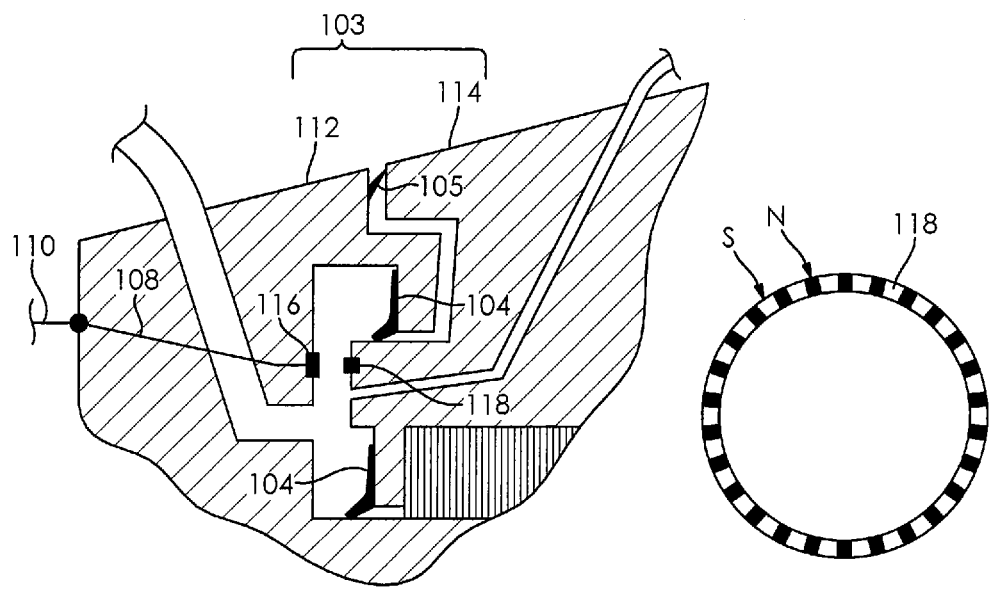
FIG. 5A  FIG. 5B
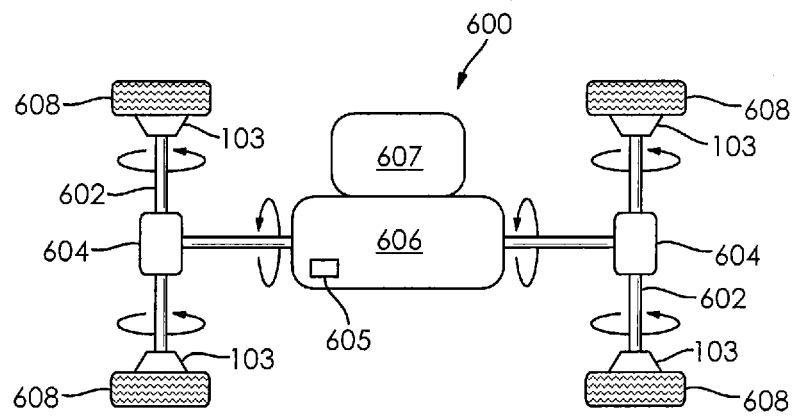
FIG. 6A
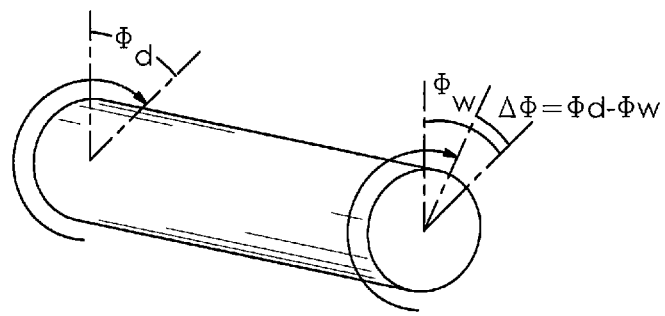
FIG. 6B

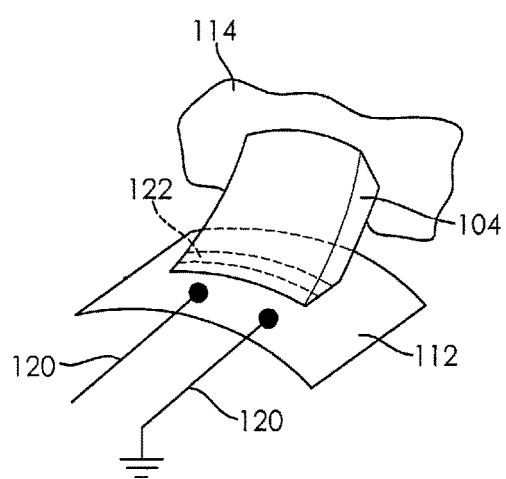
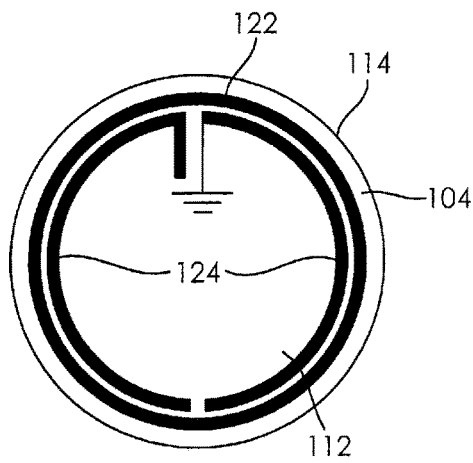
FIG. 7A  FIG. 7B
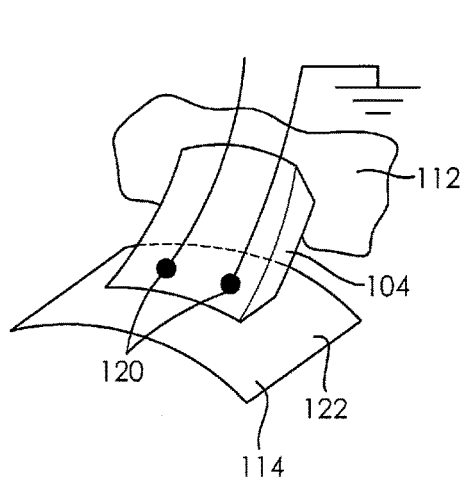
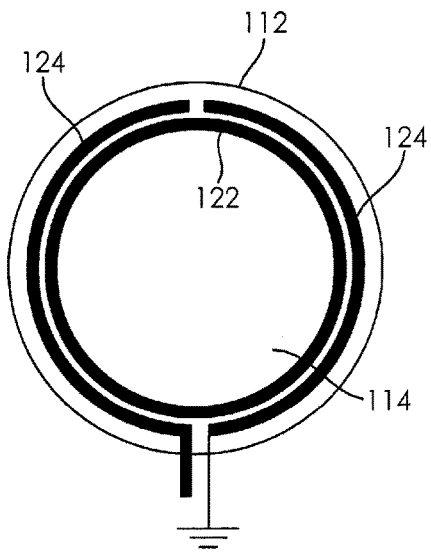
FIG. 8A  FIG. 8B

| Topic | Functionality | Wear sensor in only one wheel hub | Wear sensor in two or more wheel hubs | Variants | | | | |
|---|---|---|---|---|---|---|---|---|
| | | | | Encoder in one wheel hub, trans. speed measured | Encoder in all wheel hubs of drive axle, trans. speed measured | Encoder in all wheel hubs but one axle, trans. speed measured | Encoder in all wheel hubs, trans. speed measured |
| Methodology for Determining the Amount of Traction Torque | Intelligently rejects measurements affected by undesired disturbances | | | | | X | X |
| | Efficiency estimation of transmission | | | | | | X |
| | Adaptive auto-diagnosis of sensors | | | | X | X | X |
| | Adaptive learning of vehicle tractive performances | | | | | | X |
| | Adaptive diagnosis of the vehicle driveline | | | X | X | X | X |
| Rotary Joint Including Wear Monitoring | Use of nested electrodes | X | X | | | | |
| | Use of magnetic sensors | X | X | | | | |
| | Automatic calibration of magnetic sensor | X | X | | | | |
| | Cooperative automatic calibration of magnetic sensors | | X | | | | |

FIG. 13

INTEGRATION OF SENSOR NETWORK AND METHOD OF OPERATION INTO A CTIS FRAMEWORK

RELATED APPLICATIONS

The present application claims the benefit to U.S. Provisional Application No. 62/118,014 filed on Feb. 19, 2015, which is incorporated herein in its entirety by reference.

FIELD OF THE INVENTION

The present invention relates to the use of sensorized components for a driveline and more particularly to sensorized components used with tire inflations systems and methods for estimating traction torque of the driveline.

BACKGROUND OF THE INVENTION

Productivity of off-highway and heavy vehicles is typically correlated to several factors, such as performance in a number of ways. Examples of these factors are drivability of the vehicle and reliability of the vehicle. Recently, vehicle manufacturers have expended great efforts to improve performances of such vehicles, pushed by stringent customer requirements and a high competitiveness of global markets. Modern engines and transmissions have recently integrated sensors and control algorithms that have significantly increased vehicle performance, allowing these vehicles to operate under critical conditions while still being able to traverse large distances. Driveline components of such vehicle may be complex subsystems that integrate auxiliary functions, which can enhance the usability and flexibility of off-highway vehicles. In particular, a vehicle may include an integrated central tire inflation system (CTIS) that provides for inflation or deflation of the tires of the vehicle through an on-board pump and a set of rotary joints integrated into wheel hubs. Wheel hubs used with a rotary joint of a CTIS are complex components from a mechanical point of view, but such increased complexity provides many advantages over conventional wheel hubs.

Wheel hubs are mechanical components in which movement and torque are transferred from drive shafts into the axle to the wheel. Off-highway vehicles are designed to work in tough conditions and therefore wheel hubs used with off-highway vehicle must also do the same. The components of the wheel hubs are enclosed to protect them from an external operating environment. In addition, the mechanical complexity of wheel hubs can increase even more when they include additional functionalities, such as the forming a portion of a CTIS.

CTIS are on-board vehicle systems that allow an operator of the vehicle to inflate and deflate tires to improve drivability and fuel consumption of the vehicle in response to a wide range of driving surfaces. FIGS. 1A, 1C, and 1E illustrate a state of a tire in three conditions the vehicle including a CTIS may traverse. FIGS. 1B, 1D, and 1F illustrate a "footprint" of the tire against a surface the vehicle including a CTIS may traverse. High tire pressures, shown in FIG. 1A, are used on hard surfaces, such as but not limited to tarmac, to reduce rolling friction, which decreases fuel consumption at higher speeds. Low tire pressures, shown in FIG. 1E, are used on loose surfaces where a large tire footprint reduces a contact pressure, which improves vehicle grip and drivability. Medium tire pressures, shown in FIG. 1C, are used in intermediary circumstances where good grip is required and where some amount of tire deflection is useful. The core component of the CTIS is the rotary joint, which allows high pressure air flowing through conduits forming a port of or placed adjacent the axle into the rotating tire. Rotary joints in general comprise a first ring-shaped component fixed to the axle or a steering arm, a second ring-shaped component fixed to a rim of the wheel, and a series of sealing gaskets, typically sealing lips, that retain high pressure air inside an interface volume between the two ring shaped components. FIGS. 2A and 2B schematically illustrate an exemplary embodiment of a wheel hub 200 including a rotary joint 202 known in the art. The rotary joint 202 shown in FIGS. 2A and 2B further includes a dirt excluder 204, which is a gasket used to protect the mechanical portions of the rotary joint 202 from undesired dust particles.

A wheel hub that allows for a monitoring of the sealing gaskets used within while also allowing a torque delivered to the wheel to be estimated is not known in the art. Encoders integrated into wheel hubs to measure the rotational speed of the wheel, however, are known in the art. For example, U.S. Pat. No. 6,538,426 to Enrietto et al., discloses a combined hub temperature and wheel speed sensor system.

It would be advantageous to develop a wheel hub for use with a central tire inflation system for a vehicle including integrated sensors and a method for processing information collected from such a wheel hub that increases a reliability of the wheel hub and provides information about torque delivered by the vehicle.

SUMMARY OF THE INVENTION

Presently provided by the invention, a wheel hub for use with a central tire inflation system for a vehicle including integrated sensors and a method for processing information collected from such a wheel hub that increases a reliability of the wheel hub and provides information about torque delivered by the vehicle, has surprisingly been discovered.

In one embodiment, the present invention is directed to a rotary joint for use with a central tire inflation system. The rotary joint comprises a non-rotating portion defining a portion of a conduit used with the central tire inflation system, a rotating portion defining a portion of a conduit used with the central tire inflation system, the rotating portion spaced apart from the non-rotating portion, a first sealing gasket disposed on one of the non-rotating portion and the rotating portion and sealingly engaged with a remaining portion of a remaining one of the non-rotating portion and the rotating portion, the first sealing gasket including a portion of a sealing gasket wear detection system, a second sealing gasket disposed on one of the non-rotating portion and the rotating portion and sealingly engaged with a remaining portion of a remaining one of the non-rotating portion and the rotating portion, and a rotary encoder disposed within a joint cavity. A portion of the rotary encoder is disposed on the non-rotating portion and a remaining portion of the rotary encoder is disposed on the rotating portion. The non-rotating portion, the rotating portion, the first sealing gasket, and the second sealing gasket define the joint cavity which is a portion of a conduit used with the central tire inflation system.

In another embodiment, the present invention is directed to a network of sensorized components for a driveline. The network comprises a sensorized wheel hub in communication with a communication bus, a transmission speed sensor in communication with the communication bus, and a controller in communication with the sensorized wheel hub and the transmission speed sensor through the communication bus. The controller facilitates determining at least one of an amount of torque applied to at least one wheel forming a portion of the driveline, an estimated efficiency of a transmission of the driveline, an operational status of the sensorized wheel hub and the transmission speed sensor, a decreased efficiency of the driveline, and a status of a portion of the driveline using signal analysis.

In yet another embodiment, the present invention is directed to a method of utilizing a network of sensorized components to analyze a driveline. The method comprises the steps of providing a sensorized wheel hub in communication with a communication bus, providing a transmission speed sensor in communication with the communication bus, providing a controller in communication with the sensorized wheel hub and the transmission speed sensor through the communication bus, collecting information from the sensorized wheel hub and the transmission speed sensor, fusing the collected information using the controller to reconstruct a current operational state of the driveline, comparing a previously learned model of the driveline to the current operational state of the driveline, and determining if the current operational state of the driveline is free from undesired disturbances, wherein in the event that the driveline is free from undesired disturbances an estimation of the driveline torque is performed.

In yet another embodiment, the present invention is directed to a method for monitoring a wear of a sealing gasket of a rotary joint for use with a central tire inflation system. The method comprises the steps of providing the rotary joint comprising a non-rotating portion defining a portion of a conduit used with the central tire inflation system, a rotating portion defining a portion of a conduit used with the central tire inflation system, the rotating portion spaced apart from the non-rotating portion, a first sealing gasket disposed on one of the non-rotating portion and the rotating portion and sealingly engaged with a remaining portion of a remaining one of the non-rotating portion and the rotating portion, and a second sealing gasket disposed on one of the non-rotating portion and the rotating portion and sealingly engaged with a remaining portion of a remaining one of the non-rotating portion and the rotating portion, providing a rotary encoder disposed within a joint cavity, wherein a portion of the rotary encoder is disposed on the non-rotating portion and a remaining portion of the rotary encoder is disposed on the rotating portion and the non-rotating portion, the rotating portion, the first sealing gasket, and the second sealing gasket define a joint cavity which is a portion of a conduit used with the central tire inflation system, providing a sealing gasket wear detection system comprising a sensor used within or adjacent the first sealing gasket, a communication bus, and a controller, and using the controller to monitor for a signal indicating the first sealing gasket is in a worn condition, wherein the first sealing gasket and the rotary encoder are in communication with the controller through the communication bus.

Various aspects of this invention will become apparent to those skilled in the art from the following detailed description of the preferred embodiment, when read in light of the accompanying drawings.

BRIEF DESCRIPTION OF THE FIGURES

The above, as well as other advantages of the present invention will become readily apparent to those skilled in the art from the following detailed description when considered in the light of the accompanying drawings in which:

FIG. 1A is a side plan view of a tire in a first condition;

FIG. 1B is a bottom plan view of a portion of the tire shown in FIG. 1A showing a "footprint" of the tire in the first condition against a surface;

FIG. 1C is a side plan view of a tire in a second condition;

FIG. 1D is a bottom plan view of a portion of the tire shown in FIG. 1C showing a "footprint" of the tire in the second condition against a surface;

FIG. 1E is a side plan view of a tire in a third condition;

FIG. 1F is a bottom plan view of a portion of the tire shown in FIG. 1E showing a "footprint" of the tire in the third condition against a surface;

FIGS. 2A and 2B schematically illustrate an exemplary embodiment of a wheel hub including a rotary joint known in the art;

FIGS. 5A and 5B schematically illustrate an encoder and a ring-shaped magnetized surface used with the rotary joint illustrated in FIGS. 3 and 4;

FIG. 6A schematically illustrates a drivetrain for a vehicle, the drivetrain including the rotary joint illustrated in FIGS. 3 and 4;

FIG. 6B illustrates a shaft depicting a methodology for determining an amount of torque based on torsional rigidity;

FIG. 7A illustrates a first configuration for positioning electrodes into a sealing gasket used with the rotary joint illustrated in FIGS. 3 and 4;

FIG. 7B illustrates an alternate embodiment of the configuration for positioning electrodes into a sealing gasket illustrated in FIG. 7A;

FIG. 8A illustrates a second configuration for positioning electrodes into a sealing gasket used with the rotary joint illustrated in FIGS. 3 and 4;

FIG. 8B illustrates an alternate embodiment of the configuration for positioning electrodes into a sealing gasket illustrated in FIG. 8A;

FIG. 13 is a chart indicating functionalities relating to the rotary joint shown in FIGS. 3 and 4 and the methodology for determining the amount of traction torque with respect to six variations of a network of sensorized components for the driveline illustrated in FIG. 6A.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts of the present invention. Hence, specific dimensions, directions, orientations or other physical characteristics relating to the embodiments disclosed are not to be considered as limiting, unless expressly stated otherwise.

Figure 3:
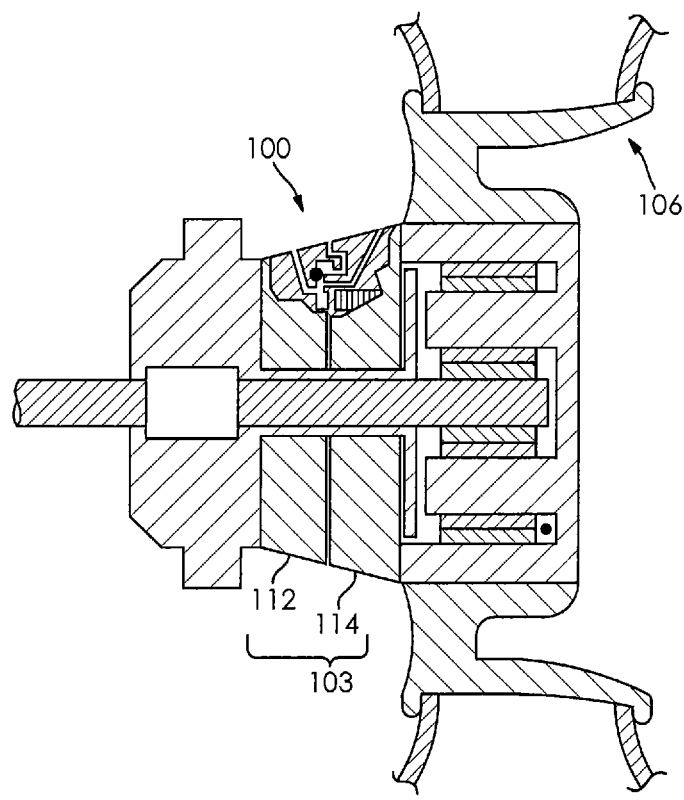
FIGS. 3 and 4 illustrate a wheel hub for use with a central tire inflation system according to an embodiment of the invention.
Figure 4:
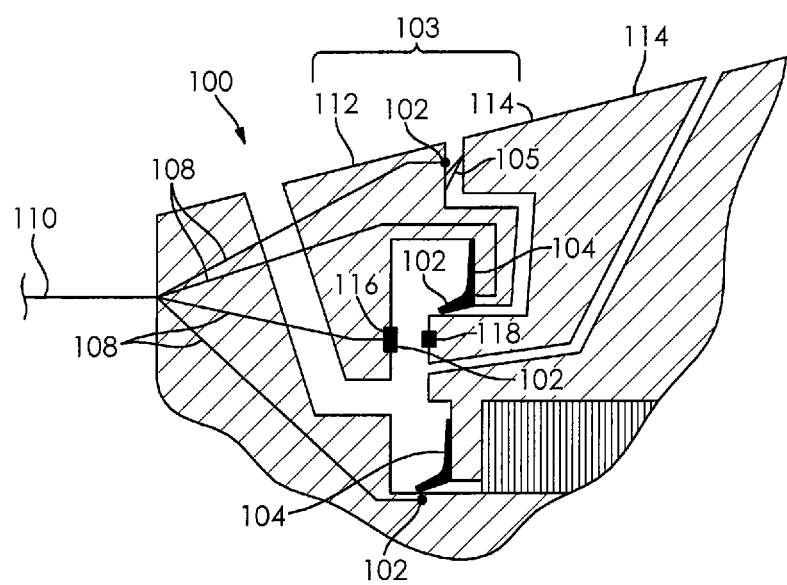

FIGS. 3 and 4 illustrate a wheel hub 100 for use with a central tire inflation system (CTIS) (not shown). The CTIS including the wheel hub 100 is a mechatronic system which integrates a network of sensors 102 into portions of a rotary joint 103 used with a vehicle including the CTIS. The CTIS including the wheel hub 100 includes the use of signal processing algorithms and may find particular usefulness with off-highway vehicles. The CTIS including the wheel hub 100 also includes a methodology to acquire and pre-process data collected from each of the sensors 102. Pre-processing data from each of the sensors 102 prepares the data for further use within the CTIS or in other vehicle systems.

The CTIS including the wheel hub 100 facilitates quantification of a wear of at least one sealing gasket 104 used with the rotary joint 103. Further, the CTIS including the wheel hub 100 facilitates quantification of a wear of a dirt excluder 105. The CTIS including the wheel hub 100 also facilitates estimation of an amount of traction torque delivered to a wheel 106 associated with each wheel hub 100.

FIGS. 3 and 4 schematically illustrate an exemplary arrangement of a plurality of the sensors 102 within the rotary joint 103. A plurality of conductors 108, each in communication with the sensors 102 and a communication bus 110, are routed through a non-rotating portion 112 of the rotary joint 103. A rotating portion 114 of the rotary joint 103 is disposed adjacent to the non-rotating portion 112. The communication bus 110 is in further communication with a data logger (not shown).

A rotational speed of the wheels 106 is measured through an encoder 116 (which is also one of the sensors 102) integrated into the rotary joint 103. As a non-limiting example, the encoder 116 may be a magnetic encoder, but it is understood that the encoder 116 may utilize other technologies, such as optical. For exemplary purposes, herein it is described that the encoder 116 used with the rotary joint 103 is a magnetic encoder, but it is understood that the encoder 116 may be any type of encoder used to establish a relationship between fixed and rotating parts. A benefit of positioning the encoder 116 within the rotary joint 103 is that it allows the encoder 116 to operate in a protected and clean environment, since only air is flowing through the rotary joint 103. FIGS. 5A and 5B schematically illustrate the encoder 116 and a ring-shaped magnetized surface 118 used with the rotary joint 103. The encoder 116 may be a Hall effect sensor which is coupled to the non-rotating portion 112 of the rotary joint 103, and in communication with the data logger through the communication bus 110. Moreover, if the encoder 116 is a magnetic encoder utilizing a Hall effect sensor, the encoder 116 faces a periodic magnetic field generated by the ring-shaped magnetized surface 118 (shown in FIG. 5B) on the rotating portion 114 of the rotary joint 103. When the wheel 106 rotates, the encoder 116 measures a variation in a magnetic field induced by the ring-shaped magnetized surface 118, and outputs a periodic electrical signal through the associated conductor 108. If an additional encoder (not shown), which may also be a Hall effect sensor, is placed in quadrature to the encoder 116, it is possible to determine a direction of rotation of the wheel 106. A resolution of the encoder 116 is selected according to a range of speeds to be measured. An upper limit of the measurable speed is determined by a frequency of the clock driving the counter, while a minimum measurable speed is determined by an angular resolution of the encoder 116.

The signal measured by the encoder 116 is processed through a counting algorithm that is used in standard encoders, and provides a direct measurement of a rotational speed of the wheel 106.

The CTIS including the wheel hub 100 uses sealing gaskets 104 fitted with electrodes 120 or conductive material 122 to determine when wear occurs to the sealing gasket 104. The dirt excluder 105 may also be configured in a similar manner described herein. FIGS. 7 and 8 illustrate two possible configurations and two designs for each configuration for positioning the electrodes 120 or conductive material 122 into the sealing gaskets 104 to measure wear of the sealing gasket 104.

As shown in FIG. 7A, the sealing gasket 104 is coupled to the rotating portion 114 of the rotary joint 103. Two electrodes 120 are placed against an internal surface of the non-rotating portion 112 of the rotary joint 103. A first one of the electrodes 120 is connected to a ground and the remaining one of the electrodes 120 is connected to a pull-up digital input of the data logger. A ring of the conductive material 122 is nested within the sealing gasket 104 and closes an electrical circuit between the electrodes 120 when the sealing gasket 104 becomes worn. It is understood that the electrodes 120 and the conductive material 122 nested within the sealing gasket 104 form a sensor 102 for use with the rotary joint 103 as described hereinabove.

As shown in FIG. 8A, the sealing gasket 104 is fixed to the non-rotating portion 112 of the rotary joint 103. Two electrodes 120 are integrated into the sealing gasket 104. A first one of the electrodes 120 is connected to a ground and the remaining one of the electrodes 120 is connected to the pull-up digital input of the data logger. When the sealing gasket 104 becomes worn, the two electrodes 120 become exposed and close an electric circuit using the rotating portion 114, which acts as the conductive material 122. It is understood that the electrodes 120 integrated into the sealing gasket 104 and the conductive material 122 form a sensor 102 for use with the rotary joint 103 as described hereinabove.

For each of the configurations shown in FIGS. 7A and 8A, alternate embodiments are shown in FIGS. 7B and 8B. Each of the designs shown in FIGS. 7B and 8B utilize a pair of semicircular electrodes 124 instead of the electrodes 120, which maximize a sensing area, and thus improves an accuracy of the CTIS including the wheel hub 100.

Figure 9:
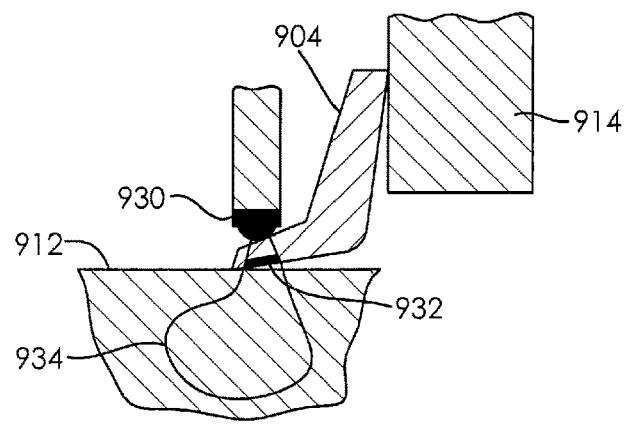
FIG. 9 is a detailed view of a magnetic sensor used with a rotary joint shown in FIG. 10A, the rotary joint including a magnetic sensor for sensing a magnetic field affected by a gap between a magnetic inclusion and a metallic surface of the rotary joint.
Figure 10A:
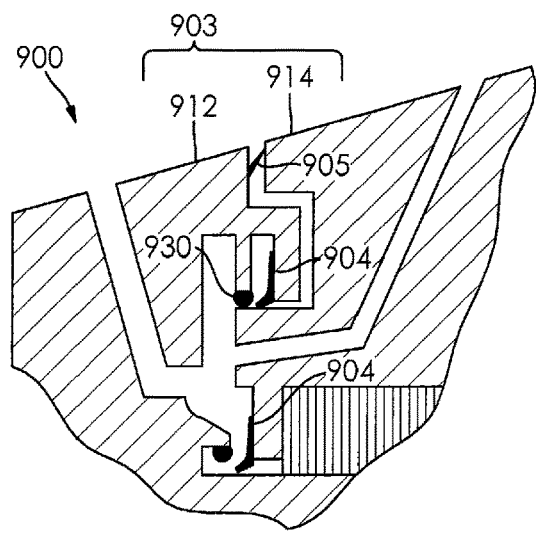
FIG. 10A illustrates a variation of the rotary joint shown in FIGS. 3 and 4, the rotary joint including the magnetic sensor.
Figure 10B:
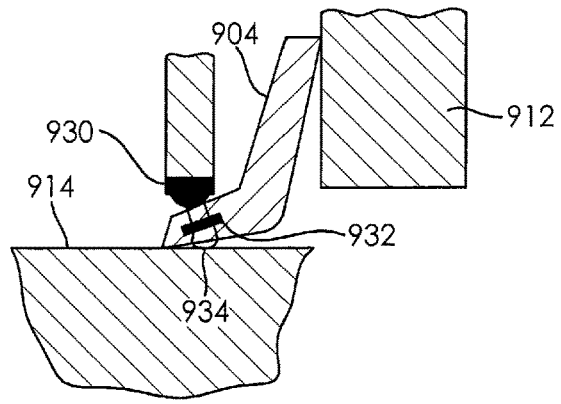
FIG. 10B is a detailed view of a magnetic sensor used with a rotary joint shown in FIG. 10A, the rotary joint including a magnetic sensor for sensing a magnetic field affected by a gap between the magnetic inclusion and the metallic surface of the rotary joint.

FIGS. 9, 10A, and 10B illustrate a variation of the rotary joint 103 shown in FIGS. 3 and 4. FIG. 10A illustrates a rotary joint 903 for use with a central tire inflation system (CTIS) (not shown) including a magnetic sensor 930 for the proportional reading of the wear of the sealing gaskets 904. The embodiment shown in FIGS. 9, 10A, and 10B includes similar components to the rotary joint 103 shown in FIGS. 3 and 4. Similar features of the embodiment shown in FIGS. 3 and 4 are numbered similarly in series, with the exception of the features described below.

The wheel hub 900 illustrated in FIG. 10A including the magnetic sensor 930 provides proportional readings about a wear of the sealing gaskets 904. As shown in FIGS. 9 and 10B, each of the sealing gaskets 904 includes a metallic inclusion 932 located inside of the sealing gasket 904. The magnetic sensor 930 is positioned adjacent to the sealing gasket 904. Each of the magnetic sensors 930 is configured to generate and sense a magnetic field 934. Such a magnetic field 934 is affected by a gap between the magnetic inclusion 932 and a metallic surface (forming a portion of the non-rotating portion 912 or the rotating portion 914) against which each of the sealing gaskets 904 is sealingly engaged with. As described herein, air pressure within the rotary joint 903 facilitates sealing engagement between each of the sealing gaskets 904 and the non-rotating portion 912 or the rotating portion 914.

The magnetic sensor 930 is preferably mounted on the non-rotating portion 912 of the rotary joint 903, thus easing connections such as power supply and channel outputs from each magnetic sensor 930. As shown in FIG. 9, when the sealing gasket 904 is anchored to the rotating portion 914 of the rotary joint 903, the metallic inclusion 932 inside of the sealing gasket 904 can cover a small circumferential portion of the sealing gasket 904, or it can be a continuous ring. The sealing gasket 904 having the metallic inclusion 932 covering a small circumferential portion of the sealing gasket 904 is easier to manufacture, however it provides only a local reading of the health status of the sealing gasket 904 and it requires signal processing hardware (not shown) capable of measuring a periodic-impulsive signal. Alternately, in the preferred embodiment, the metallic inclusion 932 is the continuous ring, which affords the opportunity to monitor the health status of the whole sealing gasket 904.

When the sealing gasket 904 is anchored to the non-rotating portion 912 of the rotary joint 903, as shown in FIG. 10B, the metallic inclusion 932 can cover a small fraction of the circumference of the sealing gasket 904, since the magnetic sensor 930 will always be disposed adjacent the same portion of the sealing gasket 904. In such an embodiment, if it is desired to have a distributed monitoring of the health status of the sealing gasket 904, it is necessary to include additional magnetic sensors 930 within the rotary joint 903 which face different angular sectors of the sealing gasket 904.

Figure 12:
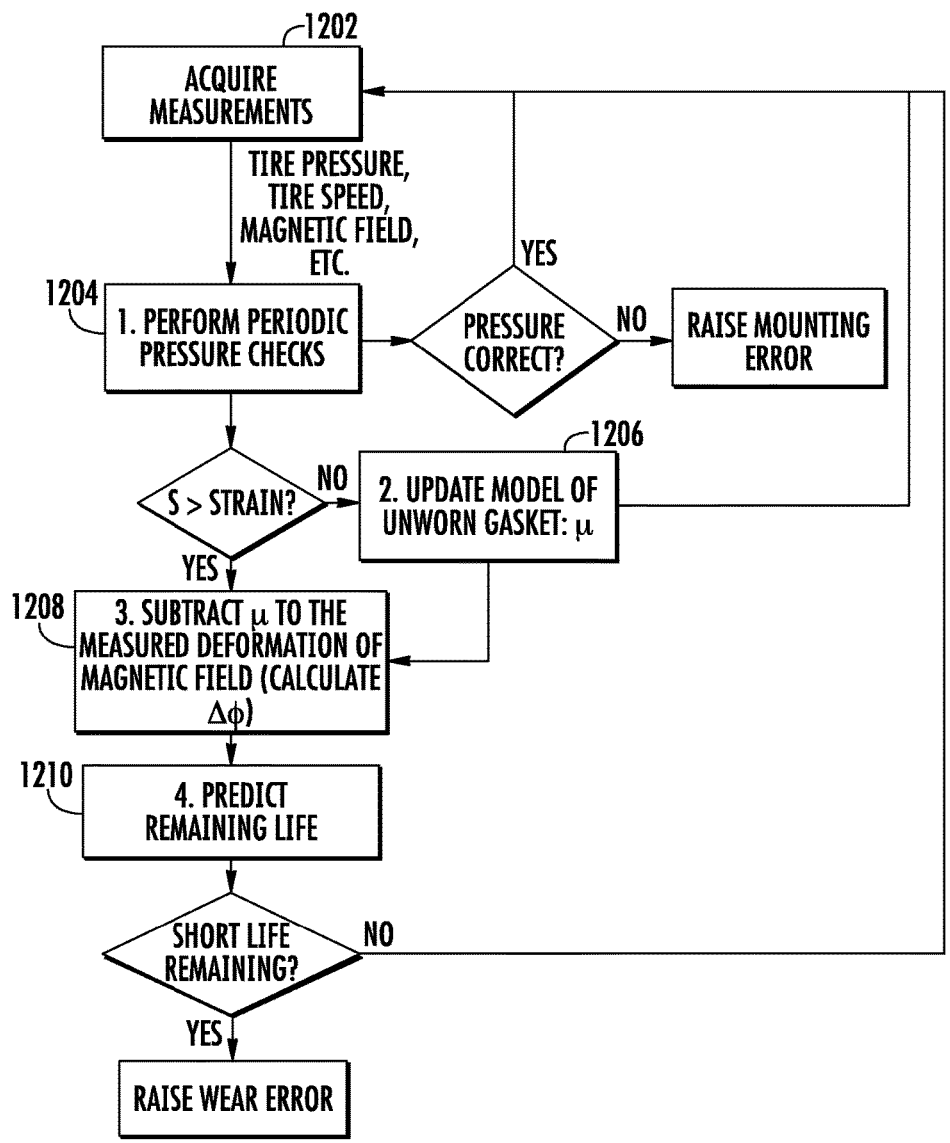
FIG. 12 schematically illustrates a method for automatic calibration of the magnetic sensors shown in FIGS. 9 and 10.

In addition to the rotary joint 903 as described hereinabove, the invention also comprises a method for automatic calibration of the magnetic sensors 930 for monitoring wear of the sealing gasket 904. A critical aspect of the magnetic sensor is represented by its Calibration of the magnetic sensors 930 may be defined as the relation between deformation of the magnetic field 934 and a magnitude of a gap between the metallic inclusion 932 and the opposite metallic surface of the non-rotating portion 912 or the rotating portion 914 against which the sealing gasket 904 is sealingly engaged. Such a relation depends on many factors, for instance and as non-limiting examples, a wear of the sealing gasket 904, a pressure of the air inside of the rotary joint 903, and speed of the rotating portion 914 of the rotary joint 903. The method for automatic calibration of the magnetic sensors 930 is based on machine learning techniques, and the method is used to predict a residual life of the sealing gasket 904. FIG. 12 schematically illustrates the method for automatic calibration of the magnetic sensors 930.

For the sake of clarity, the method for automatic calibration of the magnetic sensors 930 as schematically illustrated in FIG. 12 is proposed in an exemplary manner, but it is understood that many other machine learning approaches can be used (for example, deep learning, Gaussian processes, etc.). In a first step 1202, a plurality of measurements are collected from the vehicle including a driveline 600 (shown in FIG. 6A) and CTIS system, such as but not limited to, a pressure in each of a plurality of wheels 608 (shown in FIG. 6A), a speed of the vehicle, and a deformation of the magnetic field 934 measured by the magnetic sensor 930. Following measurement acquisition in the first step 1202, the method includes four operation phases.

First, the overall functionality of each of the rotary joints 903 is verified at a first operation phase 1204. The first operation phase 1204 is accomplished by performing periodic pressure checks. In the event that anomalous leakages are detected within the system a feedback to the user is provided by raising a mounting error.

Next, a second operation phase 1206 lasts until a space s traveled by the rotary joint 903 (calculated based on a rotational speed of the rotary joint 903) is greater than a strain value (for example, the strain value might be about 15-20% of a maximum distance the sealing gasket 904 can travel for, as predicted by a manufacturer of the sealing gasket 904). During the second operation phase 1206 the algorithm learns a model of the sealing gasket 904 in unworn condition, where the wheel-related measurements (for example, a speed of the wheel 608, a pressure of the wheel 60S, etc.) are correlated to a measured deformation of the magnetic field 934.

Once the model of the sealing gasket 904 in unworn condition is known, it is possible to compensate for the deformation of the magnetic field 934 due to external factors (such as the speed of the wheel 608, the pressure of the wheel 608, etc.) in a third operation phase 1208, thus obtaining a contribution of the deformation of the magnetic field 934 due to the wear of the sealing gasket 904. The deformation of the magnetic field 934 due solely to a wear of the sealing gasket 904 may be referred to as $\Delta\varphi$.

By monitoring $\Delta\varphi$ across the space traveled by the rotary joint 903, it is possible to predict a remaining life of the sealing gasket 904 in a fourth operation phase 1210. The estimation in the fourth operation phase 1210 is based on a regression of the latest values of $\Delta\varphi$ and relative distances covered (or operational time t) with a function of known shape (for example, polynomial or exponential) defined over: $s \rightarrow \Delta\varphi$ (or $t \rightarrow \Delta\varphi$). The shape of the function can be determined based on experimental tests performed in a laboratory setting. As an example, it can be assumed that the function has an exponential shape of the form: $\Delta\varphi_f(s) = Ae^{Bs}$, where A and B are the coefficients identified through a regression over the set of most recent measured magnetic field deformations $\Delta\varphi$ and their corresponding traveled distances s. The function $\Delta\varphi_f(s)$ can be then used to predict what will be a deformation of the magnetic field $\Delta\varphi$ if the distance $s+\Delta s$ is traveled.

The condition of the sealing gasket 904 in a worn condition can be associated to low values of $\Delta\varphi_f(s)$ (where 'low' is a value calibrated from experimental tests performed in a laboratory setting). Another solution can be to monitor the speed at which $\Delta\varphi_f(s)$ (or $\Delta\varphi_f(t)$) is changing over a time period, defined as the derivative of $\Delta\varphi_f(s)$ with respect to the time:

$$\frac{d\Delta\varphi_f(s(t))}{dt} = \frac{ABe^{Bs}}{v(t)}$$

Where v(t) is an imposed speed profile of the wheel 608, based as instance on a latest duty cycle performed by the vehicle including the driveline 600 (shown in FIG. 6A). It should be noted that a dependency of all the measurements with respect to time has been explicated. If the derivative of $\Delta\varphi_f(s)$ with respect to the time is high (for example greater than an empiric threshold), the sealing gasket 904 can be determined as being worn and a feedback is provided to the user. Further, it is understood that another metric can be drawn from $\Delta\varphi_f(s)$ to identify a robust indicator.

The invention also comprises a method for cooperative mutual calibration of the magnetic sensor 930 for wear monitoring of the sealing gaskets 904. Measurements carried out by the magnetic sensors 930 are affected by uncertainty and noise due to several factors (such as limitations in technology, electro-magnetic noises from an environment, mounting errors, and thermal drift, for example). It is possible to fuse such information across all of the magnetic sensors 930 in order to increase the accuracy of the model used to predict the residual life of the sealing gaskets 904 in a manner similar to the method described hereinabove for automatic calibration of the magnetic sensors 930. It is understood that any sensor fusion technique could be utilized for such a purpose. An algorithm could be based on merging the data collected from all the magnetic sensors 930. Such an extended dataset could then be utilized for estimating the wear model as described hereinabove for monitoring $\Delta\varphi$ across the space traveled (or operating time) by the rotary joint 903 for the automatic calibration of the magnetic sensors.

Figure 11:
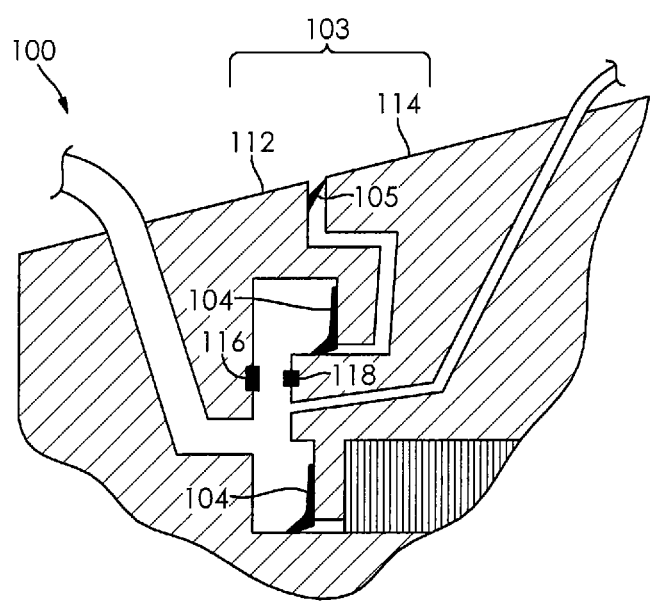
FIG. 11 illustrates the use of high pressure air within the rotary joint shown in FIGS. 3 and 4 to apply a sealing force to a pair of sealing gaskets.

FIG. 11 illustrates the use of high pressure air within the rotary joint 103, between the non-rotating portion 112 and the rotating portion 114, to apply a sealing force to each of the sealing gaskets 104. The sealing force ensures that a gap between each of the sealing gaskets 104 and at least one of the non-rotating portion 112 and the rotating portion 114 is minimized. The use of high pressure air in this manner ensures electrical contact is maintained between the electrodes 120 or the semicircular electrodes 124 and the conductive material 122 shown in FIGS. 7A, 7B, 8A, and 8B.

In use, a wear of the sealing gaskets 104 or the dirt excluder 105 may be determined by measuring an electrical signal at the pull-up digital input of the data logger. As a non-limiting example, when the sealing gasket 104 or the dirt excluder 105 is in a relatively new condition the data logger reads a voltage close to a supplied voltage and when the sealing gasket 104 or the dirt excluder 105 is in a worn condition the data logger reads a voltage close to zero.

Use of a single data logger in communication with the communication bus 110 may be used to acquire data for at least all of the sensors 102 fitted on one of the wheel hubs 100. It is understood that the data logger may also be configured to acquire data for more than one wheel hub. As a non-limiting example, the data logger may be placed on an axle, adjacent a differential, of the vehicle including the CTIS. It is understood however, that a location of the data logger may be application dependent, and may take into consideration many factors, such as but not limited to, protection of the data logger from mud or water, for example. The data logger may be an industrial microcontroller which acquires signals from the sensors 102 fitted on the wheel hubs 100, processes the data according to at least one of methodologies previously described, and outputs a result to a vehicle CAN BUS (not shown). Such data can be utilized by a vehicle ECU for a wide range of tasks, such as but not limited to, vehicle diagnostics, vehicle prognostics, or control algorithms, for example. Each of the wheel hubs 100 is interfaced to the data logger through a dedicated bus (not shown).

In addition to the above described embodiment, it is understood that the following variations are also within the scope of the improvements for the rotary joint 103 described herein. FIG. 13 is a chart indicating which functionality described hereinabove relating to the methodology for rotary joint 103 and monitoring solutions for sealing gaskets are applicable to two variations of a network of sensorized components for a driveline 600.

In a first variation, the sensors 102 may only be installed on one wheel hub 100. Such a configuration provides information on wear of at least one of the sealing gaskets 104 and the dirt excluder 105 for a single rotary joint 103. A wear of at least one of the sealing gaskets 104 and the dirt excluder 105 of a remaining number of rotary joints 103 is then predicted based on the available information. In such a configuration, the encoder 116 on the rotary joint 103 only provides partial information regarding a traction torque delivered to the wheels 106 of the CTIS including the wheel hub 100. Accordingly, the benefits of the first variation are only to observe wear of at least one of the sealing gaskets 104 and the dirt excluder 105 used in the rotary joint 103.

In a second variation, the sensors 102 may be installed on at least two, but not all of the wheel hubs 100 of the vehicle. Such a configuration provides information about the wear of at least one of the sealing gaskets 104 and the dirt excluder 105 in each of the configured rotary joint 103, and therefore it is possible to have better predictions on the wear of at least one of the sealing gaskets 104 and the dirt excluder 105 in any rotary joints 103 not fitted with sensors 102. In such a configuration, the encoder 116 on each of the rotary joints 103 only provides partial information regarding a traction torque delivered to the wheels 106 of the CTIS including the wheel hub 100. Accordingly, the benefits of the second variation are only to observe wear of at least one of the sealing gaskets 104 and the dirt excluder 105 used in each of the rotary joint 103.

In a third variation, the sensors 102 are installed on every wheel hub 100 of the vehicle. Such a configuration monitors a status of each of at least one of the sealing gaskets 104 and the dirt excluder 105 of all of the rotary joints 103, with no need to perform approximate predictions on the wear of the sealing gaskets 104 or the dirt excluder 105. The third variation provides a complete set of measurements of traction torques delivered to each of the wheels 106, thus allowing advanced vehicle dynamics control algorithms to be employed, as well as an estimation of the total thrusting force (Ft) of the vehicle. The total thrusting force (Ft) of the vehicle may be calculated using the following equation:

$$F_t = \sum_{i=0}^{n} r_i T_{t,i}$$

In the above equation, n is the number of wheel hubs 100 of the vehicle, while $T_{t,i}$ and a radius $r_i$ are a calculated traction torque and radius of the wheel 106 designated by i. The benefits of the third variation are to observe wear of at least one of the sealing gaskets 104 and the dirt excluder 105 used in the rotary joint 103, observe rotational speed of the wheel 106, and observe delivered traction torque.

The drivetrain 600 for a vehicle, schematically illustrated in FIG. 6A, typically includes more than one axle 602 and differential 604. For such a system, a torsional rigidity K may be difficult to determine beforehand. However, the torsional rigidity K can be determined in dedicated experimental tests in which the following are measured: a rotational speed measured by a transmission speed sensor 605 at the output of a transmission 606 (which is driven by an engine 607), a rotational speed of an associated wheel 608 including the rotary joint 103, and an amount of torque delivered by the transmission 606. It is understood that the transmission speed sensor 605 is in communication with the communication bus 110.

An amount of traction torque delivered to each of the wheels 106 may be estimated from the measurements of the rotational speed of each of the wheels 106 and a rotational speed of a transmission 606 of the vehicle including the CTIS. The rotational speed of each of the wheels 106 is acquired using the above-described encoder 116 and method, while the rotational speed of a transmission 606 is acquired through the use of the transmission speed sensor 605, which may be an encoder mounted on or within the transmission 606. As a non-limiting example, the transmission speed sensor 605 used to measure the rotational speed of the transmission 606 may be a phonic wheel.

A methodology for determining the amount of traction torque is based on torsional rigidity. FIG. 6B illustrates a shaft having first and second ends, which can be considered as a drive shaft for the vehicle. As a result of torque applied by the transmission 606 to the first end, the shaft rotates to a degree, indicated by the angle φd. At the second end, an output torque will be equal to the input torque by the transmission 606, however, a rotation angle φw will be reduced by a quantity Δφ. This difference is due to the torsional stiffness K of the shaft. As K can be determined experimentally beforehand, and φd and φw can be measured, the torque applied to the shaft can be calculated using the following equation:

$$T = K\Delta\phi = K(\phi_d - \phi_w)$$

In non-theoretical situations, however, drivelines such as the drivetrain 600 are subjected to non-linear disturbances that can compromise a measurement of angle phases φd and φw between a pair of angular sensors. As a result, the estimation of traction torque for the drivetrain 600 is also compromised. One non-linear disturbance is known as driveline backlash. Driveline backlash may be defined as clearance or lost motion in a mechanism which is caused by gaps between two consecutive moving parts. Non limiting examples of affected moving parts are driveshaft joints and gear meshes. Such disturbances which are categorized as drivelines backlash can also increase during the operation of the drivetrain 600 of the vehicle.

To compensate for such non-linear disturbances, the invention also provides a filtering algorithm that increases accuracy of the estimation of traction torque by selectively rejecting measurements which are determined to be affected by driveline backlash or other non-linear disturbances. The filtering algorithm determines which measurements are affected by driveline backlash or other non-linear disturbances by employing artificial intelligence.

The filtering algorithm analyzes at least one of the following sources of information: a rotational speed of the transmission 606, a rotational speed of one or more of the wheels 608 measured at the rotary joint 103, and inputs from a driver of the vehicle the drivetrain 600 is incorporated in. As non-limiting examples, such inputs from the drive may comprise a direction request (such as forward, neutral, and reverse, for example), a throttle position, a brake usage, a steering angle of the vehicle, and a movement of auxiliary working implements (such as telescopic boom, for example).

Figure 6C:
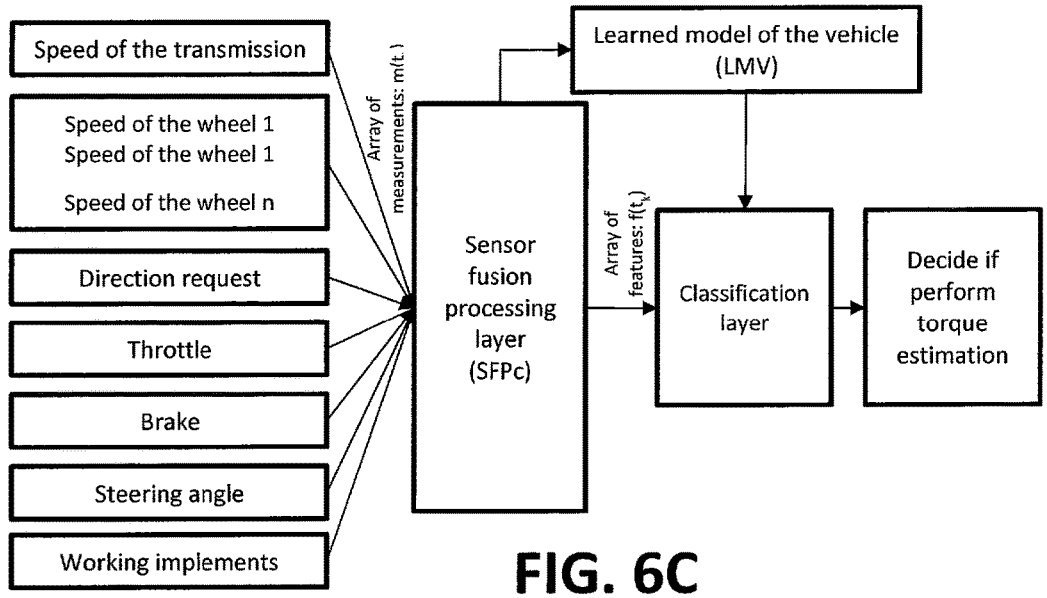
FIG. 6C schematically illustrates a filtering algorithm including a sensor fusion and processing layer according to a method of the invention.

Such information analyzed by the filtering algorithm information can be logged by a plurality of sensors placed to collect such information at the same time, but it is also understood that such information can be collected at different time instants if a timestamp is associated to each data. It is understood that at least a portion of such information may be collected by the sensors 102, 116. A remaining portion of such information may be collected or inferred by a plurality of sensors or information available via the communication bus 110. The collected information is then fed into a sensor fusion and processing layer (SFP) of the data logger or a controller in communication with the communication bus 110, where the complete set (or a reduced set) of measurements is merged in order to reconstruct a current operational state of the vehicle including the drivetrain 600. FIG. 6C schematically illustrates such a process. Further, FIGS. 6D, 6F, and 12 also schematically illustrate similar filtering processes. As shown in FIG. 6C, the information is merged in the SFP depending on a number of sources of observable information available to the SFP. In general however, the greater a number of sources of observable information that are available to the SFP, the more accurate will be an estimation of the state of the vehicle including the drivetrain 600.

For instance, the heterogeneous set of data measured at a given time instant $t_k$ can be collected into an array of measurements $m(t_k)$. The SFP layer then combines the current $m(t_k)$ together with its previous values (for example, the history of m(t)) in order to extract relevant information and structured data. The latter can be for instance, but not limited to, a transformation of one or more signals in $m(t_k)$ with a Fourier or Wavelet transformation (or any other suitable statistical descriptor of time or frequency properties of the signal $m(t_k)$). The processed information is stored in an array of features $f(t_k)$.

At least a portion of the filtering algorithm resides in a classification layer. In the classification layer, the most recent array of features $f(t_k)$ is compared against a previously learned model of the vehicle (LMV) to decide whether a current vehicle state is free from undesired disturbances (such as backlash). The traction torque is estimated if the latter condition is true, otherwise the traction torque is not updated (alternately, the traction torque can also be set equal to zero). This procedure is performed for each of the measured wheels, and any classification algorithm can be used for this purpose (as non-limiting examples, logistic regression, support vector machines, or deep learning may be used as a classification algorithm).

In the process that utilizes the filtering algorithm that increases accuracy of the estimation of traction torque, a very important part is represented by the Learned Model of the Vehicle, against which computed feature arrays $f(t_k)$ are classified. The LMV can be represented for instance as a set of f(t) arrays (each having the same mathematical and physical properties as $f(t_k)$) that are defined over an N-dimensional space (for example, the same dimension of $f(t_k)$). One out of two labels is assigned to each array of LMV. As a non-limiting example, a positive label may be assigned for arrays of features which are not affected by disturbances, and a negative label may be assigned for arrays of features that are affected by disturbances.

The LMV is initialized with a first calibration phase that is performed only once. During the calibration phase, various measurement arrays m(t) are collected (and the respective features arrays f(t) are calculated) while performing several maneuvers that are characterized by the absence and presence of external disturbances (for example, acceleration of the vehicle, travel at a substantially constant speed, and an inversion of vehicle movements, among other maneuvers). A skilled user, such as a technician, then associates to each feature array f(t) a positive label if it is associated to a measurement array that is not affected by disturbances, and a negative label if it associated to a measurement array that is affected by disturbances (such as, but not limited to backlash, for example).

Figure 6D:
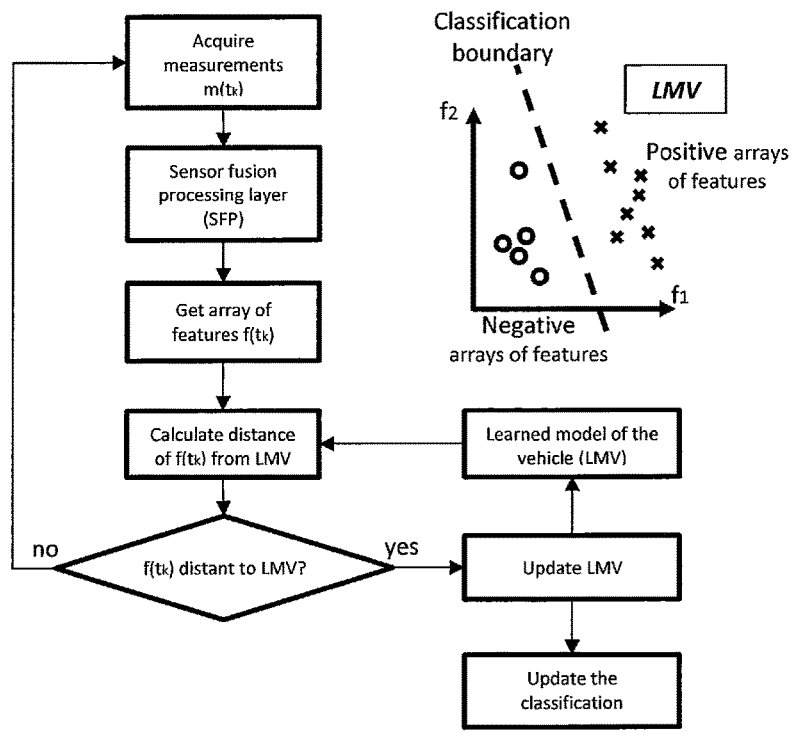
FIG. 6D schematically illustrates a learning algorithm according to a method of the invention.

The filtering algorithm that increases accuracy of the estimation of traction torque provides a methodology that can adapt to mutating operating conditions, which are very common for off-highway vehicles, which encounter a wide range of different operating conditions. To overcome this challenge, the invention also comprises a learning algorithm for determining how the vehicle is being used in order to improve the accuracy of a classification (for example, the identification of measurement data that is not affected by disturbances). Having a learning classification layer means that the Learned Model of the Vehicle is updated based on new operating conditions. Any suitable machine learning algorithm can be used to update the LMV (such as but not limited to, neural networks, deep learning, Gaussian processes, support vector machines, for example). FIG. 6D schematically illustrates the learning algorithm. Once a current $f(t_k)$ has been calculated, it is calculated the distance of this array of feature with respect to the current LMV. The distance can be quantified by any suitable metrics (such as the Mahalanobis distance, for example). If the calculated distance is greater than a predetermined threshold, the array of feature $f_{LMV,distmin}(t)$ in LMV that is closer to $f(t_k)$ is updated. The update operation can be a replacement of $f_{LMV,distmin}(t)$ with $f(t_k)$ in order to have an aggressive or quick learning process. If a less aggressive learning is desired, $f_{LMV,distmin}(t)$ can be replaced with an intermediate array between $f_{LMV,distmin}(t)$ and $f(t_k)$. It is understood, however, that such an intermediate array could be calculated through any suitable method, such as a weighted average, for example.

The aggressiveness of learning should be selected according to each specific application and in any case by looking for a compromise between an increase of robustness with respect to varying operating conditions and the increase of computational resources required for updating the classification algorithm based on the updated LMV. In general, vehicles used in short and intermittent duty cycles should update (learn) in an online manner the LMV set of array of features less frequently, since the operating conditions will likely change less frequently. In such a case, the torque estimation will be made more often and during short acceleration phase since a control unit will not be busy in updating the LMV set. On contrary, vehicles with long duty cycles will benefit from more frequent updates of LMV as long as their operating conditions continue to change. It is also possible to calibrate the aggressiveness of the learning automatically, through a procedure that monitors the latest performed duty cycles, and classifies them "short" or "long" as instance based on a traveled distance, or based on a more complicated set of features.

The invention also provides a method to facilitate determining an efficiency of the transmission 606. By knowing the traction torque in accordance with the methods described hereinabove at a given wheel 608 and a rotational speed of the given wheel 608, it is possible to calculate an amount of power delivered at the wheel 608. Next, the efficiency of the transmission 606 is computed as the ratio between the sum of all the powers of the wheels 608 and the power delivered by the engine 607, which is information that is available via the communication bus 110.

The invention also provides a method to determine a health status of the drivetrain 600 for a vehicle using the measurements of the speed of the transmission 606 and all of the wheels 608. A set of heuristic rules are used to determine a functional status of the plurality of sensors 116 and at least one sensor used with the transmission 606. As non-limiting examples, the invention comprises the following approaches to determining a health status of the drivetrain 600; determining a health status of the sensor 116 used to determine a speed of the wheel 608 and determining a health status of a traction speed sensor.

In determining a health status of the sensor 116 used to determine a speed of the wheel 608, it is assumed that the vehicle includes four wheels 608. In the event that non-null velocities are read at the transmission speed sensor 605 and at all the wheel speed sensors 116 but one, it is then necessary to identify whether the zero wheel speed measurement is due to a malfunctioning wheel speed sensor 116 or to a locked wheel. Since vehicles typically have a differential, such as the differential 604, connecting the wheels 608 on the same axle, a non-rotating locked wheel is a condition that might happen during the normal operation of the vehicle, without implicating that the wheel sensor speed has failed. Usually, in the normal use of the vehicle a locked wheel is a condition that will only last shortly since an operator of the vehicle will notice such an event and try to compensate for it, such as by reducing the throttle. Further, such an event implies that the traction power is not being delivered at all the four wheels 608, but only at the wheels 608 that are rotating. Therefore, a zero speed measurement at one wheel 608 is associated with a wheel 608 in a locked condition if the traction power at the remaining wheels 608 increases. Further, a variation of this approach can include the measurement of the power at the engine 607, which is used as an additional verification, since a total amount of power transmitted at the wheels 608 is proportional to the power delivered by the engine 607 (wherein the proportional coefficient is the efficiency of the driveline 600). Alternately, if a zero speed reading is not associated to an increased amount of traction power at the remaining wheels 608, it is indicative that all the wheels 608 are rotating and that the sensor 116 associated with the zero-reading may be non-operational.

A health status of the transmission speed sensor 605, which is used to determine traction speed, can be determined by monitoring the speed of all the wheels 608 on at least one driving axle 602 (for example, all the wheels 608 on the front axle or on the rear axle, in the case of all-wheel drive drivelines). In the event that, both the wheels on the same axle 602 are spinning and the transmission speed sensor 605 is reading a zero speed, it can be inferred that the transmission speed sensor 605 is non-operational.

The invention also provides a method to facilitate adaptive learning of vehicle tractive performance. A tractive performance of the vehicle including the driveline 600 might deteriorate due to a progressive wear of mechanical components of the axles 602 (such as but not limited to bearings, gears, etc.) and to a deterioration of a lubrication oil. These phenomena can be captured by monitoring the efficiency of the axle 602 according to the procedure described hereinabove.

Figure 6E:
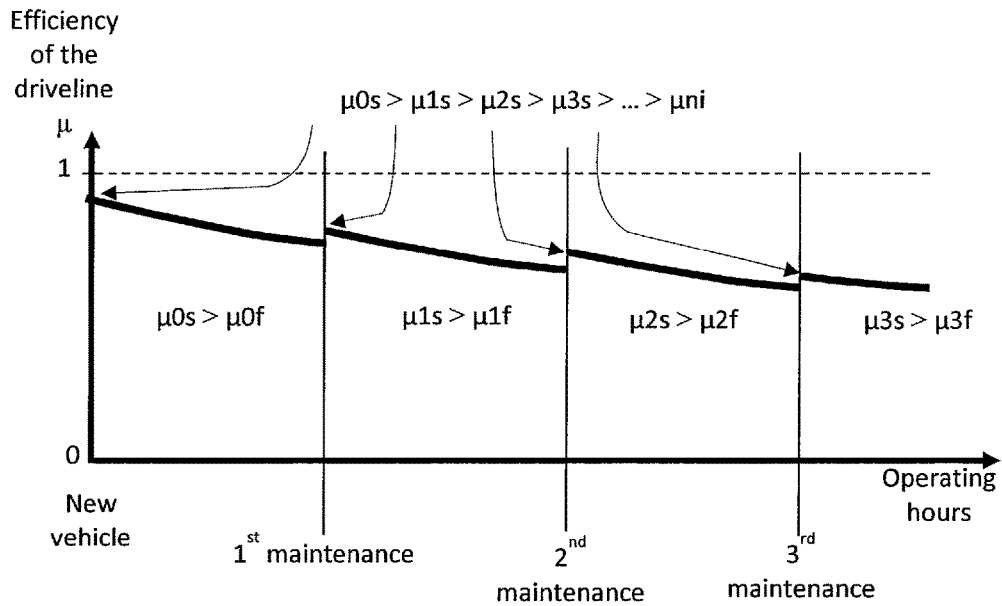
FIG. 6E is a chart which illustrates a deterioration of an efficiency of a driveline according to the invention with respect to a number of operating hours of the driveline.

By monitoring the efficiency of the axle 602 with the method to facilitate determining efficiency, it is possible to determine whether the oil is deteriorated or the mechanical components of the axle 602 are worn. The method to facilitate adaptive learning of vehicle tractive performance is based on the concept that the efficiency of the axle 602 tends to decrease over a service life of the vehicle. However, when regular maintenance is performed on the axle 602 (such as but not limited to an oil of the axle 602 being changed), such maintenance allows a recuperation of a portion of the lost efficiency. FIG. 6E is a chart which illustrates a deterioration of the efficiency of the driveline 600 with respect to a number of operating hours of the driveline 600. As shown in FIG. 6E, maintenance performed at period intervals can recuperate a portion of efficiency lost over the service life. FIG. 6E shows the efficiency with respect to a number of operating hours of the driveline 600, but it is understood that efficiency may be measured with respect to a distance traveled by the vehicle including the driveline 600 or other variables.

FIG. 6E illustrates the trend of the driveline efficiency $\mu$ with respect to the operating hours of the vehicle including the driveline 600. $\mu 0s$ is the value of the efficiency when the vehicle is in a new condition, $\mu 0f$ is the value of the efficiency preceding a first maintenance, and $\mu 1s$ is the value of the efficiency following the first maintenance. Such notation may be extended to additional maintenance periods as shown in FIG. 6E. After the first maintenance, $\mu 1s$ will be greater than $\mu 0f$, which is primarily the result of a lubricant used with the axle 602 being replaced.

Accordingly, by monitoring an increase in efficiency before and after a maintenance (for example, the difference between $\mu 1s$ and $\mu 0f$), it is possible to estimate in an online manner (meaning during a lifecycle of the vehicle) a rate of driveline efficiency drop due to oil deterioration, which may be indicated as $r_{\mu,oil}$.

A periodic maintenance of the axle 602 allows for recuperation of a portion of driveline efficiency lost due to oil deterioration, and not a portion of efficiency lost due to wear of mechanical components, and therefore $\mu 1s$ will be smaller than $\mu 0s$. By considering the efficiencies measured between two consecutive periodic maintenances (for example, the difference between $\mu 1s-\mu 0s$) it is possible to calculate a rate of efficiency drop due to worn mechanical components $r_{\mu,wear}$. The rate $r_{\mu,wear}$ is typically smaller than $r_{\mu,oil}$ since mechanical components used with the axle 602 are designed for long lifecycles.

The rates $r_{\mu,oil}$ and $r_{\mu,wear}$ will vary over time, since the two wear phenomena are not linear, and typically are correlated. For instance, deteriorated lubrication oil will increase a wear of mechanical components. For this reason, among others, the two rates can be computed each time maintenance is performed on the vehicle.

The method to facilitate adaptive learning of vehicle tractive performance has many interesting consequences. First, the continuously updated values of $r_{\mu,oil}$ and $r_{\mu,wear}$ allow to have a robust prediction of a rate of reduction of the total efficiency, even when the vehicle is used on a wide range of conditions. Next, the prediction of the residual driveline efficiency can be used to perform an optimal plan of maintenance sessions. Lastly, a manufacturer of the axle 602 can merge the estimated efficiencies from different vehicles having similar axles, thus reconstructing a reliable empirical model that can be used to predict a performance and lifecycle of the axle.

The invention also provides a method to facilitate an adaptive diagnosis of a health status of the driveline 600. Regarding the above described method to method to facilitate adaptive learning of vehicle tractive performance, such a method focuses on wear mechanisms with a slow dynamic. The method to facilitate adaptive diagnosis of a health status of the driveline 600 however, handles wear mechanisms with a fast dynamic. Such a method covers numerous phenomena relating to the mechanical components of the driveline 600. Non-limiting examples of these phenomena are broken teeth of gears used in the driveline 600, damaged races of bearings, or fretting. Further, any mechanism characterized by a periodic pattern as a result of a worn component can be covered by the method.

Figure 6F:
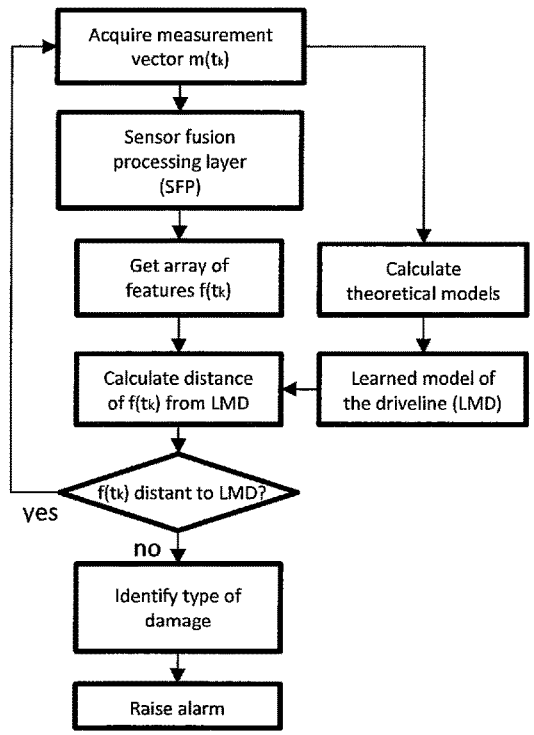
FIG. 6F schematically illustrates an algorithm for identifying anomalous patterns and updating a Learned Model of the Vehicle.

The adaptive diagnosis is based an intelligent algorithm that identifies anomalous patterns in the signals measured at the driveline 600. The measurements of these signals can be, for example, a rotational speed at one or more of the wheels 608, a rotational speed at the transmission 606, an estimated traction torque, an estimated efficiency of the driveline 600. Further, it is understood that any combination of this information may be utilized by the adaptive diagnosis. The identification of anomalous patterns utilizes the same algorithm shown in FIG. 6D, with the exception of the step for updating the Learned Model of the Vehicle, which in this case is called a Learned Model of the Driveline (LMD), and is schematically illustrated in FIG. 6F. As a non-limiting example, the measurement vector might include the estimated traction torque, from which it is calculated the feature vector f(t) by using a Fast Fourier Transform or a Wavelet. However, it is understood that any other meaningful transformation might also be suitable.

Figure 6G:
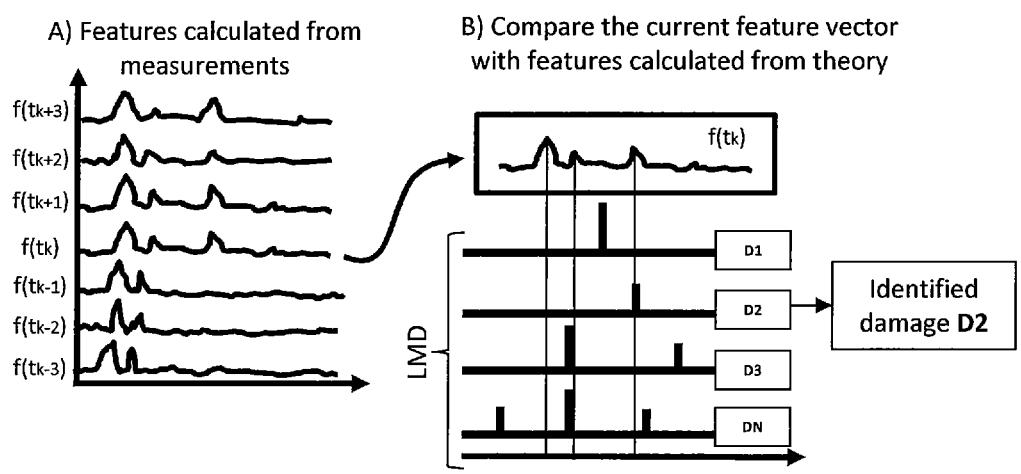
FIG. 6G schematically illustrates a classifier searches a measured feature vector for known patterns of a Learned Model of the Vehicle.

The LMD can be represented as a set of feature vectors generated from theoretical models of different damage modes. Such theoretical models are evaluated for the current measurement data, in order to adapt the LMD to the current operating condition of the driveline 600. As shown in FIG. 6G, a classifier then searches if a measured feature vector $f_{tk}$ contains any known pattern in the LMD. If so, it is identified which damage mode has been found, based on the comparison. As shown in FIG. 6G, which is exemplary, the known pattern identified by the classifier is indicated as identified damage D2.

In addition to the above described embodiment, it is understood that the following variations are also within the scope of the methodologies related to determining the amount of traction torque for the driveline 600 described herein. FIG. 13 is a chart indicating which functionality described hereinabove relating to the methodology for determining the amount of traction torque for the driveline 600 is applicable to four variations of a network of sensorized components for a driveline 600.

In a first variation, the encoder 116 is installed on only one wheel hub 100 and the speed of the transmission 606 is measured using the transmission speed sensor 605. In such a configuration, the encoder 116 of the rotary joint 103 which is sensorized provide only partial information on the traction torque of the wheels 608 of the vehicle the driveline 600 is incorporates in. Accordingly, such a variation does not provide enough data to be used with some of the vehicle dynamic control algorithms described herein. However, using such a variation it is still possible to monitor the health status of the driveline 600 by looking for anomalies in the recorded speeds of the wheel hub 100 and transmission 606, as described hereinabove.

In a second variation, the encoder 116 is installed on all the wheel hubs 100 of a drive axle (such as when only one of the axles 602 is driven by the transmission 606) and the speed of the transmission 606 is measured using the transmission speed sensor 605. In addition to the benefits of the first variation described above, it is also possible to implement the method to facilitate an adaptive diagnosis of a health status of the driveline 600 as described hereinabove.

In a third variation, the encoder 116 is installed on all the wheel hubs 100 of all but one of the axles 602 and the speed of the transmission 606 is measured using the transmission speed sensor 605. With this configuration it is possible to measure the traction torque on all the wheel hubs 100 that include encoders 116, and then estimate the traction torque at the axle 602 having wheel hubs 100 that do not include encoders 116. The traction torque at the axle 602 having wheel hubs 100 that do not include encoders 116 is the difference between the torque generated by the engine 607 at a flywheel (not shown) (and multiplied for ratio of the transmission 606), and the sum of all the estimated traction torques at the wheel hubs 100 that include encoders 116. It should be noted that the traction torque estimated at the axle 602 having wheel hubs 100 that do not include encoders 116 may be less accurate than using other methods, as the efficiency of the driveline 600 cannot be estimated using the third variation.

In a fourth variation, the encoder 116 is installed on all the wheel hubs 100 of all the axles 602 and the speed of the transmission 606 is measured using the transmission speed sensor 605. Out of all of the variations described herein, this variation is the most complete configuration, and allows all the proposed methodologies related to the torque estimation to be performed.

Further, it is understood that any permutation of the first through fourth variants described hereinabove may be combined with any of the variants relating to the rotary joint 103 described hereinabove.

In accordance with the provisions of the patent statutes, the present invention has been described in what is considered to represent its preferred embodiments, however, it should be noted that the invention can be practiced otherwise than as specifically illustrated and described without departing from its scope or spirit.

What is claimed is:

1. A rotary joint for use with a central tire inflation system, comprising:
    a non-rotating portion defining a portion of a conduit used with the central tire inflation system;
    a rotating portion defining a portion of a conduit used with the central tire inflation system, the rotating portion spaced apart from the non-rotating portion;
    a first sealing gasket disposed on one of the non-rotating portion and the rotating portion and sealingly engaged with a remaining portion of a remaining one of the non-rotating portion and the rotating portion, the first sealing gasket including a portion of a sealing gasket wear detection system;
    a second sealing gasket disposed on one of the non-rotating portion and the rotating portion and sealingly engaged with a remaining portion of a remaining one of the non-rotating portion and the rotating portion; and
    a rotary encoder disposed within a joint cavity, wherein a portion of the rotary encoder is disposed on the non-rotating portion and a remaining portion of the rotary encoder is disposed on the rotating portion and the non-rotating portion, the rotating portion, the first sealing gasket, and the second sealing gasket define the joint cavity which is a portion of a conduit used with the central tire inflation system; and wherein a pressurization of the joint cavity facilitates substantial contact between the sealing gasket wear detection system and one of the non-rotating portion and the rotating portion of the rotary joint.

2. The rotary joint according to claim 1, wherein the second sealing gasket includes a portion of the sealing gasket wear detection system.

3. The rotary joint according to claim 1, wherein the sealing gasket wear detection system includes an electrode disposed within the first sealing gasket and the rotating portion of the rotary joint including a conductive material.

4. The rotary joint according to claim 1, wherein the sealing gasket wear detection system includes conductive material disposed within the first sealing gasket and an electrode disposed in the non-rotating portion of the rotary joint.

5. The rotary joint according to claim 1, wherein the sealing gasket wear detection system comprises a plurality of sensors in communication with a communication bus.

6. The rotary joint according to claim 1, wherein the sealing gasket wear detection system comprises a sensorized dirt excluder.

7. The rotary joint according to claim 1, wherein the rotary encoder comprises a Hall effect sensor coupled to the non-rotating portion of the rotary joint and a ring-shaped magnetized surface on the rotating portion of the rotary joint.

8. The rotary joint according to claim 1, wherein the sealing gasket wear detection system comprises a metallic inclusion within the first sealing gasket and a magnetic sensor positioned adjacent to the sealing gasket.

9. A method for monitoring a wear of a sealing gasket of a rotary joint for use with a central tire inflation system, comprising the steps of:
    providing the rotary joint comprising a non-rotating portion defining a portion of a conduit used with the central tire inflation system, a rotating portion defining a portion of a conduit used with the central tire inflation system, the rotating portion spaced apart from the non-rotating portion, a first sealing gasket disposed on one of the non-rotating portion and the rotating portion and sealingly engaged with a remaining portion of a remaining one of the non-rotating portion and the rotating portion, and a second sealing gasket disposed on one of the non-rotating portion and the rotating portion and sealingly engaged with a remaining portion of a remaining one of the non-rotating portion and the rotating portion;
    providing a rotary encoder disposed within a joint cavity, wherein a portion of the rotary encoder is disposed on the non-rotating portion and a remaining portion of the rotary encoder is disposed on the rotating portion, and the non-rotating portion, the rotating portion, the first sealing gasket, and the second sealing gasket define a joint cavity which is a portion of a conduit used with the central tire inflation system;
    providing a sealing gasket wear detection system comprising a sensor used within or adjacent the first sealing gasket, a communication bus, and a controller, and wherein a pressurization of the joint cavity facilitates substantial contact between the sealing gasket wear detection system and one of the non-rotating portion and the rotating portion of the rotary joint; and using the controller to monitor for a signal indicating the first sealing gasket is in a worn condition, wherein the first sealing gasket and the rotary encoder are in communication with the controller through the communication bus.

10. The method according to claim 9, wherein the second sealing gasket includes a portion of the sealing gasket wear detection system.

11. The method according to claim 9, wherein the sealing gasket wear detection system includes an electrode disposed within the first sealing gasket and the rotating portion of the rotary joint including a conductive material.

12. The method according to claim 9, wherein the sealing gasket wear detection system includes conductive material disposed within the first sealing gasket and an electrode disposed in the non-rotating portion of the rotary joint.

13. The method according to claim 9, wherein the sealing gasket wear detection system comprises a plurality of sensors in communication with the communication bus.

14. The method according to claim 9, wherein the sealing gasket wear detection system comprises a sensorized dirt excluder.

15. The method according to claim 9, wherein the rotary encoder comprises a Hall effect sensor coupled to the non-rotating portion of the rotary joint and a ring-shaped magnetized surface on the rotating portion of the rotary joint.

16. The method according to claim 9, wherein the sealing gasket wear detection system comprises a metallic inclusion within the first sealing gasket and a magnetic sensor positioned adjacent to the sealing gasket.

17. The method according to claim 16, further comprising the step of monitoring for a signal indicating the first sealing gasket is in a worn condition based on a magnetic field detected using the magnetic sensor.

18. The method according to claim 17, further comprising the step of performing a calibration process for the magnetic sensor that includes a step of compensating for deformation of the magnetic field due to external factors.

19. The method according to claim 16, further comprising the step of performing a calibration process for the magnetic sensor, the calibration process based on a model of the first sealing gasket in an unworn condition.

20. The method according to claim 16, further comprising the step of performing a calibration process for the magnetic sensor based on a data fusion from a plurality of magnetic sensors.

\* \* \* \* \*